UNITED STATES PATENT OFFICE.

LEWIS B. LINDEMUTH, OF NEW YORK, N. Y.

MANUFACTURE OF OPEN-HEARTH METAL.

1,385,562. Specification of Letters Patent. Patented July 26, 1921.

No Drawing. Application filed July 23, 1920. Serial No. 398,487.

*To all whom it may concern:*

Be it known that I, LEWIS B. LINDEMUTH, of New York, State of New York, have invented certain new and useful Improvements in the Manufacture of Open-Hearth Metal; and I do hereby declare the following to be a full, clear, and exact description of the invention, such as will enable others skilled in the art to which it appertains to make and use the same.

My invention relates to the manufacture of open hearth steel and consists in the method of treating metal for the operating of small steel plants which necessarily buy their pig iron for their open hearth furnaces.

A small steel plant according to present practice charges cold pig metal into the open hearth. It is the object of this invention to combine in a workable combination a series of steps that will enable such a plant to charge hot metal into its open hearth furnace, thereby obtaining not only a very good metal in such a small plant but also effecting a large economy.

An open hearth furnace operating on an initial charge of 100 per cent. cold material requires twice the time for charging than if fifty per cent, or fifty-five per cent. molten material were used and in addition to this, the labor required for handling the cold stock and the mechanical equipment for transferring it is very much greater than if it were possible to charge molten metal. In addition to this, there is a difference of twenty per cent. and over in the time required to make a heat of steel.

Furthermore it is to be pointed out that by melting iron or steel scrap, cast or malleable iron scrap, pig iron or off grade pig iron in a cupola, the sulfur content of the molten metal under present day conditions is so great as to prohibit the use of cupola metal directly in the open hearth furnace.

My invention is designed and intended to overcome these difficulties and eliminate the costs herein before enumerated and to this end I melt in an ordinary gray-iron, foundry-cupola, a charge consisting of 100 per cent. steel scrap or a charge consisting of a mixture of steel scrap and cast iron scrap. The cast iron scrap may be replaced in whole or in part by malleable iron scrap, pig iron, or off grade products of pig iron or any mixtures of these various metals as the operator may deem expedient or necessary.

A single cupola may be used or a number of cupolas may be used, this cupola or these cupolas running, either continuously or periodically, one or all of them, in order to preferably obtain a discharge in a continuous stream, to a suitable basic lined, electric furnace, the molten charge of which is maintained covered with a basic reducing slag. The metal from this furnace is continuously discharged or periodically discharged as the requirements may demand into a mixer, and the metal from this mixer is run into the open hearth furnace, forming in this furnace any desired proportion of the metallic charge.

Under these conditions the cupolas may be run at a low temperature thereby preventing a too great scouring action on their linings at their melting zones. Thus their life is prolonged and the labor of fettling decreased. The cupola metal will contain approximately three per cent. carbon. The necessary heat is imparted to the melt in the electric furnace to maintain the metal molten and if necessary the temperature may be increased in the electric furnace thereby increasing its fluidity. As the electric furnace is run reducing I, preferably continuously feed to the electric furnace basic slag forming materials consisting of 65% to 75% CaO plus MgO, the balance being silica and the impurities usually present such as alumina &c. and the slag is covered with powdered coal, coke or other carbonaceous material with a practical minimum amount of air entering the furnace. Such a slag picks up no reducible oxids. In other words, this slag will contain only traces of $FeO, MnO, Fe_2O_5$ and even titanium and vanadium oxids will not remain in the slag. Sulfur is primarily removed under the basic conditions existing in the electric furnace as the sulfur content of the slag may reach 3%.

Manganese or silicon may be added in the cupola if desired but preferably in the electric furnace, *i. e.* either to the metal from a single cupola in the furnace or to a mixture of cupola metals from several cupolas. The run through the electric furnace is preferably continuous to the mixer. The mixer is heated and is of any usual type to maintain the metal hot while standing. The charge in a basic open hearth furnace may be, say 40 to 45% cold steel scrap and 60 to 65% synthetic pig metal from the mixer. The charge in an acid lined open hearth furnace may be, say 65% to 70% steel scrap and only 30% to 35% synthetic pig metal. The open hearth steel is finally finished and brought up to requirements in the usual manner.

It will thus be seen that the open hearth operation is either in a large measure or wholly independent of the purchase of pig metal and the reduced cost of scrap materially cheapens the open hearth process and results in an open hearth steel in every respect equal to open hearth steel made from the usual pig metal. The slag from the electric furnace is either continuously or intermittently removed. The cupola metal is preferably supplied continuously to the electric furnace to maintain a continuous process of producing the synthetic pig metal. The quantity of synthetic pig metal charged into the open hearth furnace in a heat will depend upon the judgment of the furnaceman.

I claim:

1. The method of manufacturing open hearth steel which comprises producing a synthetic pig metal from scrap in a melting furnace, removing sulfur therefrom and charging said pig metal into an open hearth furnace, treating said metal under open hearth conditions and finishing the metal according to requirements.

2. The method of manufacturing open hearth steel which comprises producing a cupola metal from scrap, transferring said metal to a separate furnace and increasing the heat of the metal therein under basic reducing conditions thereby removing sulfur and utilizing the resulting metal in an open hearth furnace for the manufacture of steel.

3. The method of manufacturing open hearth metal which comprises producing a cupola metal high in carbon content, maintaining a continuous run of such metal through a basic lined electric furnace while maintaining a covering thereon of basic reducing slag, adding silicon or manganese in one of the aforesaid furnaces and thereby forming a synthetic pig metal, charging said pig metal into an open hearth furnace and forming steel therefrom in the usual manner.

4. The method of manufacturing open hearth steel which comprises producing one or more cupola runs from scrap thereby increasing the carbon content of the metal, transferring the cupola metal to a basic lined electric furnace, maintaining a reducing basic slag covering thereon in said furnace, continuously discharging said metal to a mixer, and from time to time withdrawing mixer metal to an open hearth furnace and utilizing said metal as a substitute for pig metal in open hearth operations.

In testimony that I claim the foregoing as my invention, I have signed my name.

LEWIS B. LINDEMUTH.